(No Model.)
J. C. DAGGETT.
Valve for Waste Pipes.
No. 229,972.                    Patented July 13, 1880.
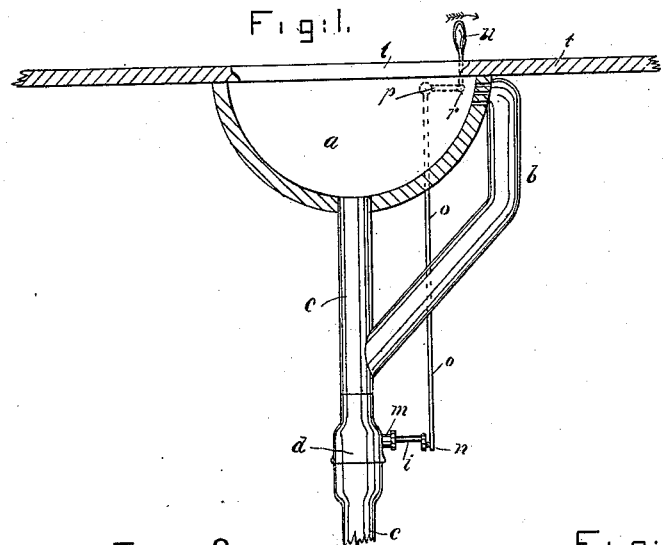
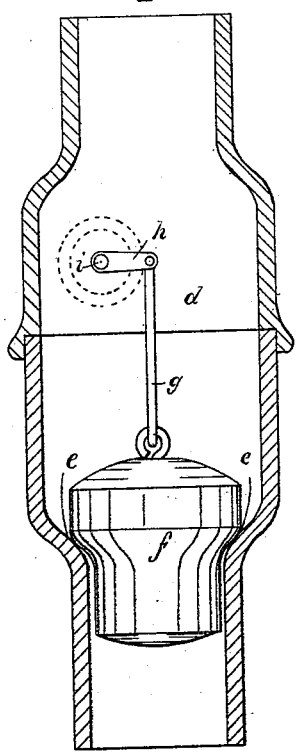
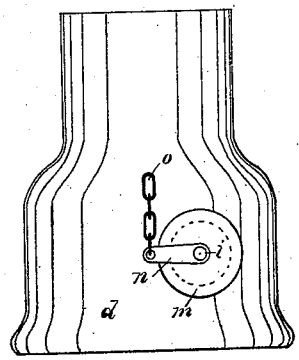
Witnesses
N. E. C. Whitney.
L. F. Connor.
Inventor
John C. Daggett
by Crosby & Gregory Attys

UNITED STATES PATENT OFFICE.

JOHN C. DAGGETT, OF BOSTON, MASSACHUSETTS, ASSIGNOR OF ONE-HALF OF HIS RIGHT TO WILLIAM W. WHITCOMB, OF SAME PLACE.

VALVE FOR WASTE-PIPES.

SPECIFICATION forming part of Letters Patent No. 229,972, dated July 13, 1880.

Application filed April 14, 1880. (No model.)

*To all whom it may concern:*

Be it known that I, JOHN C. DAGGETT, of Boston, county of Suffolk, and State of Massachusetts, have invented an Improvement in Valves for Waste-Pipes, of which the following description, in connection with the accompanying drawings, is a specification.

My invention relates to a valve for waste-pipes, and has for its object to prevent the passage of sewer-gas out from the said waste-pipes.

The valve is shown as placed in a valve-chamber just below the junction of the usual waste and overflow pipes of a wash-bowl, and is made as a plug, shaped to fit a tapering seat, upon which it is pressed by its own weight, thus completely closing the pipe at all times when it is not positively raised by the operator to allow the water to run out from the bowl.

The valve is connected by a link with an arm on a rock-shaft extended out through a suitable stuffing-box from the valve-chamber, and provided with a second crank, by which it may be rotated to raise the valve by the arm and link before mentioned.

The crank is shown as operated by a rod extended up to a nearly horizontal arm of an elbow-lever, the other arm of which extends up through a slot in the top of the wash-stand, and is provided with a handle, so that by rocking the said handle the rod is raised by the other arm of the elbow-lever and turns the crank to raise the valve and allow the water to flow off. As soon as the handle is released the valve falls to its seat, completely closing the waste-pipe, to prevent the entrance of any sewer-gas.

Figure 1 is a vertical section of a wash-bowl provided with my waste-pipe valve; Fig. 2, a longitudinal section of the valve-chamber; and Fig. 3, a rear elevation of the upper portion thereof, showing the valve-operating crank.

The wash-bowl $a$ may be provided with the usual overflow-pipe $b$, which joins the waste-pipe $c$ above the valve-chamber $d$, provided at its bottom with a suitable seat, $e$, for the valve $f$.

The valve and its seat are shown as tapering, thus insuring a tight joint when the valve rests on its seat. The valve is connected by a link, $g$, with an arm, $h$, on a shaft or stem, $i$, passing out from the valve-chamber through a suitable stuffing-box, $m$, and provided with a crank, $n$, to rotate it to raise the valve $f$ from its seat, and thus allow the passage of the waste-water.

The crank $n$ is connected by a rod or chain with one arm, $p$, of an elbow-lever pivoted at $r$, the other arm of which passes through a slot in the top $t$ of the wash-stand, and is made as a handle, $u$.

In their normal condition the parts are in the position shown in the drawings. The valve $f$ closes the waste-pipe $c$ and the bowl may be filled. When desired to empty the bowl the handle $u$ is pushed in the direction indicated by the arrow, raising the other arm, $p$, of the elbow-lever, and thus, by means of the connected rod $o$ and crank $n$, rotating the stem $i$ and arm $h$ to raise and open the valve $f$ and allow the water to flow off. As soon as the handle $u$ is released the valve immediately falls to its seat, completely closing the waste-pipe $c$ to prevent the passage of gases therethrough to the wash-bowl $a$.

It will be seen that the valve $f$ also performs the function of the usual plug-stopper at the bottom of the bowl, (which may be omitted,) and may be operated in the same manner by a simple chain passing down through either of the pipes $b$ or $c$. It is obvious that this valve may be applied to any waste-pipe by a proper modification of valve-operating parts.

If desired, a float might be connected with the valve or link $g$ to automatically open the valve when the water rises to any desired point, and thus prevent any overflow.

I claim—

1. A valve and valve-seat therefor in a waste-pipe, combined with the rock-shaft passing through the valve-case and the lever-arms thereon, one within and the other outside of the said case, the former connected with the valve and the latter with a handle, to enable the said shaft to be rotated to operate and open the valve when desired, the said valve normally resting by its own weight closed upon its seat, substantially as described.

2. The valve-seat and valve and the con nected rocking stem *i* and arm *h* and crank *n* thereon, combined with an elbow-lever having one arm connected with the said crank and the other arm made as a handle to be rocked to raise the valve and open the waste-pipe, substantially as described.

In testimony whereof I have signed my name to this specification in the presence of two subscribing witnesses.

JOHN C. DAGGETT.

Witnesses:
N. E. C. WHITNEY,
JOS. P. LIVERMORE.